United States Patent [19]

Gorishek

[11] 3,805,019
[45] Apr. 16, 1974

[54] ENERGY DISTRIBUTION SYSTEM
[75] Inventor: Joseph A. Gorishek, Elmhurst, Ill.
[73] Assignee: GTE Automatic Electric Laboratories, Incorporated, Northlake, Ill.
[22] Filed: Aug. 24, 1972
[21] Appl. No.: 283,439

[52] U.S. Cl.................. 219/349, 219/85, 219/354, 240/41.35 C, 350/299
[51] Int. Cl. ........ H05b 1/00, G02b 5/10, F21v 7/09
[58] Field of Search ........................... 219/347–349, 219/354, 343, 85; 240/41.35 R, 41.35 C; 250/88, 89; 350/292, 288; 128/395, 396

[56] References Cited
UNITED STATES PATENTS

| | | | |
|---|---|---|---|
| 3,460,930 | 8/1969 | Pityo | 219/349 UX |
| 3,518,411 | 6/1970 | Rohde | 219/349 |
| 2,927,187 | 3/1960 | Wendelken | 219/349 |
| 3,660,585 | 5/1972 | Waldron | 219/349 UX |

FOREIGN PATENTS OR APPLICATIONS 586,425  3/1947  Great Britain...................... 219/349

Primary Examiner—A. Bartis
Attorney, Agent, or Firm—D. W. Heid

[57] ABSTRACT

An energy distributing system for uniformly applying radiant energy from two energy sources to a circumferential band of a tubular member. The sources are positioned facing each other and focused upon the tubular member which is positioned midway between them. Plano-convex side reflectors disposed on either side of said tubular member collect diffuse energy and redirect it to the sides of the tubular member to realize the uniform energy distribution. Each of the side reflectors comprises two identical plano surfaces joined together to form an obtuse angle therebetween whose vertex is located on an axis of the tubular member and the optical axes of the sources.

8 Claims, 6 Drawing Figures

3,805,019

ENERGY DISTRIBUTION SYSTEM

BACKGROUND OF THE INVENTION

The field of the invention is generally related to the fabrication of reed switches. More particularly, the invention relates to an improved apparatus and method for sealing the switch contacts in position in a generally tubular pressure vessel.

In reed switches, a pair of magnetizable contact members are positioned in an overlapping spaced relationship within a non-magnetizable pressure vessel and the contact is opened or closed through the selective application of a controllable magnetic field. Switches of this general type are well known as are similar devices where more than one pair of switch contacts are enclosed within the same pressure vessel. In particular, reed switches both simple and multiple, are used by the tens of thousands in telephone switching networks and, because of this high usage it is necessary that they be both economical and highly reliable.

In designing and fabricating such switches, basic constants such as required current density, magnetic permeability of the contact members and the available magnetic flux to effect switching, tend to control the size of a contact pair and, the size of the envelope surrounding them. Thus, for a given required current density across a contact pair, there is a minimum size contact. A further mechanical constraint on minimum contact size relates to the ability of either a machine or an operator to orient them in their required position prior to and during their sealing into their pressure vessel enclosure. Because of these limitations, whenever it is necessary to increase either contact size or the number of contact pairs, it is also necessary to increase the size of their pressure vessel enclosure.

Ordinarily, the pressure vessel for the contacts is glass and the means for sealing the contacts in position involves heating the glass to cause it to flow about and bond to the contacts' terminal shank. To enhance reliability of the completed switches, the heat sealing is performed under conditions that tend to inhibit contamination of the switch and its envelope. Among the frequently encountered conditions is the use of infrared heating and the employment of an inert gas atmosphere. While infrared heating is effective for this purpose, to maintain resonable power efficiencies it is necessary to focus the heat energy in a relatively small volume. The small volume of space where heating is effective makes it difficult to regularly achieve good contact seals as the size of the envelope increases and various steps have been taken in overcoming this problem including placing a reflector behind the envelope relative to the infrared source and the use of plural IR sources. However, as switch envelope sizes continued to increase, such conventional means for improving seal quality have proved ineffective, cumbersome or expensive, since they either did not work satisfactorily or they so intruded upon the area surrounding the switch elements being sealed that their assembly became difficult.

SUMMARY OF THE INVENTION

It is accordingly a principal object of the invention to provide improved means for heat sealing the pressure vessel envelopes of reed switches. Another object of the invention is to improve the quality of the seal achieved while reducing the clutter surrounding the switch during assembly and effecting this either at constant or reduced cost. These objects are achieved by a novel system for redirecting the energy from two IR sources so that its application to the seal area of the switch envelope is more uniform than previously possible with this number of sources. In the inventive system, two radiant IR sources are arranged facing and aligned with each other and with their heating area focused upon and overlapping the desired sealing area of the switch envelope located adjacent the sealing area of the switch envelope, and on either side as viewed from the position of an IR source, is a side relfector which focuses and redistributes radiant energy that would otherwise be lost so that it impinges upon the sides of the envelope. The improved uniformity of heat distribution that results improves both quality and appearance of the finished seal and radically reduces rejections that were caused by unequal heat distribution.

DESCRIPTION OF THE PREFERRED EMBODIMENTS

Figure 1:
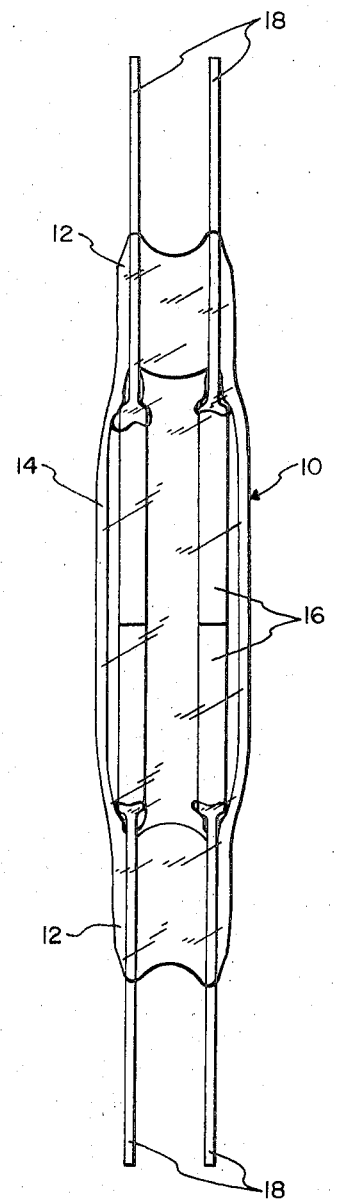
FIG. 1 is a view of a reed switch indicating the poor appearance and quality of a seal fabricated prior to discovery of the inventive energy distribution system.

FIG. 1 illustrates the poor geometry of the drape, the generally poor appearance and marginal seal achieved in a multiple contact reed switch 10 fabricated using two infrared energy sources set up facing each other and focused upon the sealed areas 12 of glass envelope 14. Drape is the amount of glass flow on the switch blade areas 16 and, as illustrated, has flowed so far down the terminal shanks 18 that is contacts the blade areas. This tends to cause either or both of blade misalignment and a variation in the spring characteristics of the contacts such that switch operation is either impaired or prevented. For the larger sizes of glass envelopes employed with multiple contact switches this excessive drape occurs in a significantly high percentage of the switches manufactured and most often is accompanied by an ineffective seal because of the non-uniform glass flow.

Figure 2:
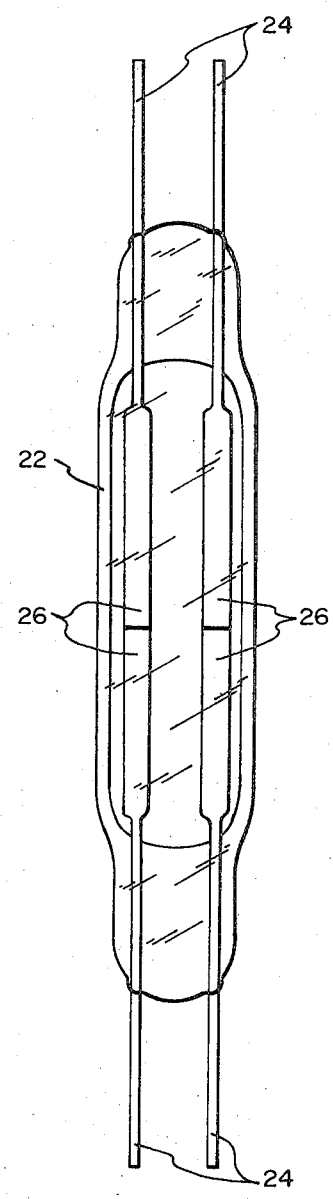
FIG. 2 illustrates the appearance of the seal of a reed swith fabricated using the inventive energy distribution system.

The multiple contact switch shown in FIG. 2 portrays a near ideal seal. The glass envelope 22 has formed an effective and generally uniform seal about the terminal shanks 24 at either of its ends and without any drape on the switch blades 26. The near ideal seals of FIG. 2 were achieved using the energy distribution system shown in FIGS. 3 and 4. This system distributes the energy more uniformly on all sides of the glass envelope than other contemporary systems which provide an uneven distribution with most energy concentrated on the envelope sides nearest the IR source.

Figure 4:
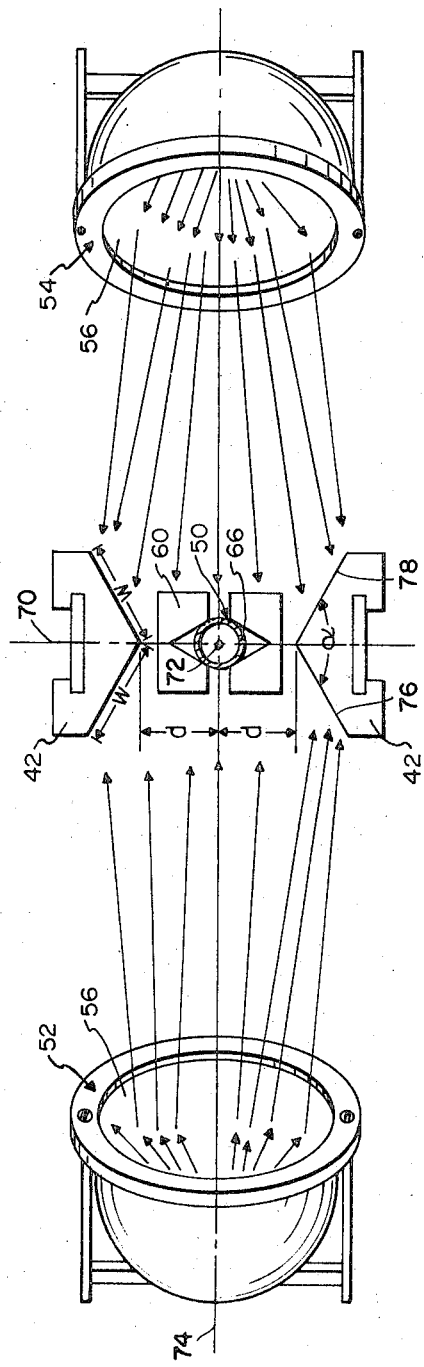
FIG. 4 is a top view of the inventive energy of distribution system.
Figure 5:
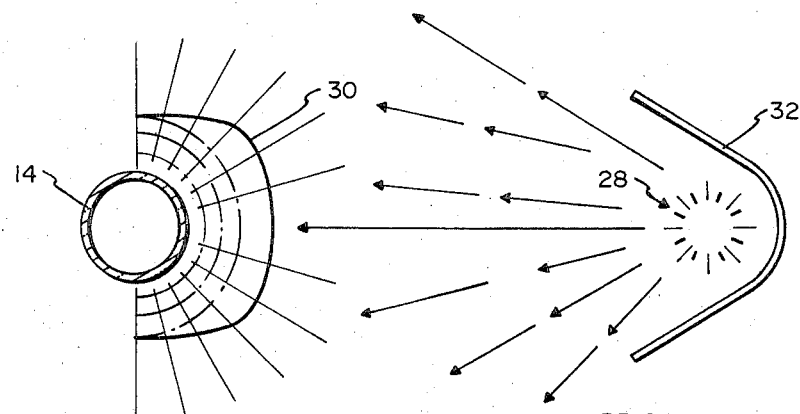
FIG. 5 is a polar diagram illustrating the energy distribution achieved in glass sealing prior to the invention.
Figure 6:
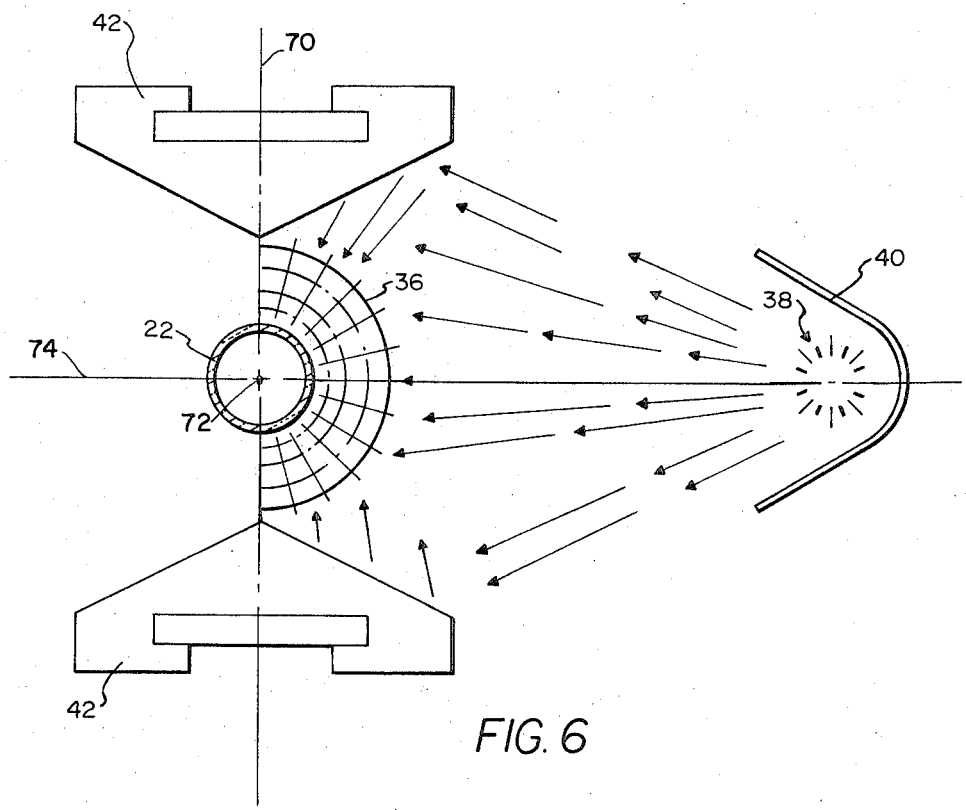
FIG. 6 is a polar diagram illustrating the energy distribution achieved with the inventive system.

The polar energy distribution realized with prior art systems using focused infrared energy source is plotted for a hemisphere of the switch envelope in FIG. 5. FIG. 6 illustrates the energy distribution achieved with the inventive system shown in FIGS. 3 and 4. As can be seen from the polar plot at 30 in FIG. 5, the energy source as focused by reflector 32 results in a substantially larger amount of energy incident upon the envelope 14 on the side nearest the source 28 and a fall-off to negligible amounts 90 degrees off axis from the source. Conversely, the energy distribution of the inventive system about the envelope 22 as shown at 36 in FIG. 6 is substantially uniform throughout the entire hemisphere and is achieved with an energy source 38 and reflector 40 that are identical to those used in FIG. 5. This improvement in uniformity in turn results in a more uniform softening and melting of the glass envelope around its entire circumference. The more uniform melting permits closer process control and the repetitive achievement of seals such as illustrated in FIG. 2 with substantially no rejections. As described in connection with FIGS. 3 and 4, these improvements in seal quality and rejection rate are effected through use of novel supplemental reflectors 42.

Figure 3:
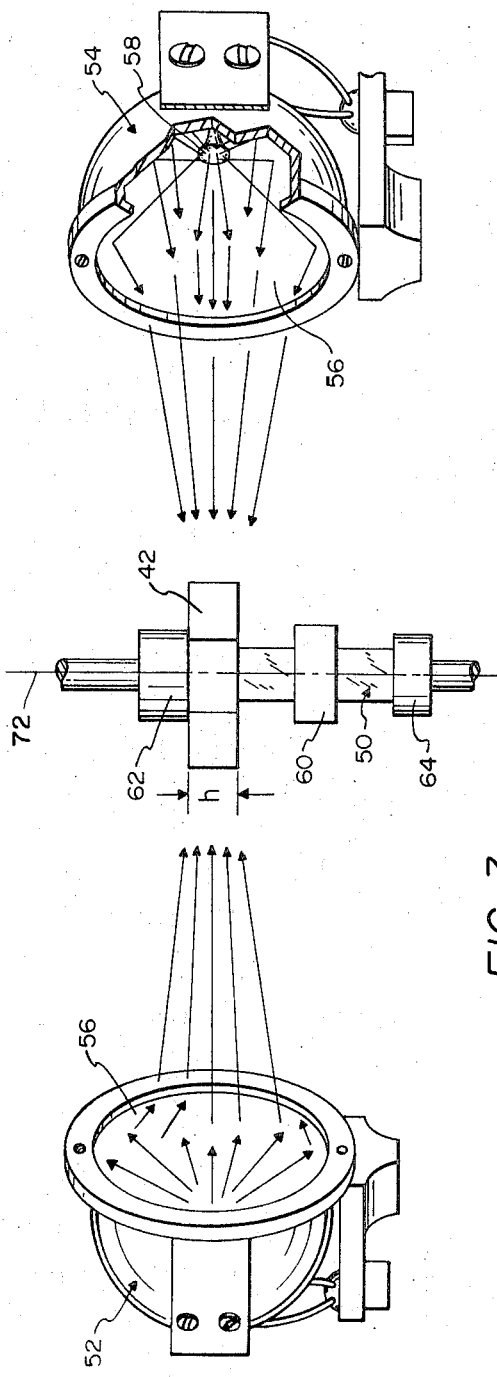
FIG. 3 is a side view of the inventive energy distribution system.

FIGS. 3 and 4 illustrate the inventive energy distribution system in side and top views, respectively. Some of the reed switch contact holding structure shown in FIG. 3 has not been shown in FIG. 4 to clarify the drawing presentation. The upper end 66 of glass envelope 50 into which switch contacts are sealed is centrally disposed between two infrared radiant energy sources 52 and 54 and substantially at their focal point. After the upper envelope seal is completed, the energy sources are shifted to a position aligned with the lower end of the envelope so that end can be sealed.

Both of the energy sources are alike and conventional and each comprises an ellipsoid reflector 56 with a tubular tungsten-halogen lamp 58 located at its focal point. Because the lamp is not a point source and because of errors inherent in its location and the surface figure of the reflector, studies have shown that the energy pattern at the other focus generally is somewhat spherical in shape and desirably, the size of this shape is established so that its smallest axis is at least slightly larger than the envelope diameter to allow uniform heating. In determining the shape of the focused energy pattern, energy measurements were plotted and the pattern size limits arbitrarily established at the point where energy was 50 percent of maximum.

The glass envelope 50 is supported at the foci of the two energy sources by means of a glass chuck 60. The switch contact blades to be fused interior of the envelope are supported in an upper switch contact chuck 62 and a lower switch contact chuck 64. As pointed out above, the energy distribution on the envelope achieved by the energy sources alone is extremely non-uniform, as shown in FIG. 5. However, it is a feature of the invention that the energy distribution about the circumference of the envelope 50 is made almost perfectly uniform as shown in FIG. 6 through use of the novel side reflectors 42. It has been discovered that this energy distribution is achieved if the reflectors 42 are constructed of a material that reflects infrared energy or is plated with such a material; e.g., gold, and are disposed and constructed as set forth in the following table:

REFLECTOR 42

| PARAMETER | DIMENSION |
|---|---|
| $\alpha$ | 100° minimum, 130° maximum, 120° preferred |
| w | envelope diameter, ±10%, |
| h | desired seal length −5%, +10% |
| d | envelope diameter ±20% |

The side reflectors 42 are symmetrically disposed on either side of the circumferential area of glass envelope 50 about an axis labeled 70 in FIGS. 4 and 6. The reflector axis 70 is mutually perpendicular to and intersects both the longitudinal axis 72 of envelope 50 and a straight line 74 that passes through the center of the energy bundle and the centers of the sources of radiant energy 52 and 54. The side reflectors 42 include two plano surfaces 76 and 78 that are joined together to form the obtuse angle $\alpha$ with the concave surface of each side reflector facing away from the glass envelope or tubular member 50. The dimension "h" in the table is the height of each plano surface 76 and 78 while the "w" dimension is the length of each plano surface 76 and 78. The dimension "d" is the distance from the vertex of the side reflector 42 formed by surfaces 76 and 78 to the center of the glass envelope or tubular member 50.

The foregoing dimensions are dependent upon the mirrors being symmetrically disposed angularly and height-wise about the envelope area it is desired to seal. The inventor has theorized that these dimensions other than for the "h" dimension are the practical limits of energy gathering ability for the diffuse energy from the sources that is required for a uniform energy distribution about the envelope seal area. Changes in the "h" dimension of the mirror directly affect the length of the seal. Changes in the angle $\alpha$ affect the uniformity of the seal, the most uniform seals being achieved with $\alpha$ = 120°. Further, while the length w can increase without limit except for interference with fixturing; no substantial benefit has been achieved when it exceeds +10 percent.

The foregoing description of the energy distribution system has set forth a system which provides nearly ideal sealing characteristics, and which results in a more uniform distribution of infrared energy about the envelope of a reed switch than heretofore attainable with but two energy sources. This description was based upon ellipsoidal reflectors and tungsten-halogen lamps. However, this should not be considered as a limitation since the system of the invention has proven effective with any reflector that provides either a somewhat spherical energy bundle at the switch envelope or an energy bundle that is band-like with a somewhat circular cross-section. Similarly, infrared energy sources other than tungsten-halogen may be used although these are presently preferred because of their operating efficiency, cleanliness and comparatively long life. Thus, it will be understood that variations and modifications can be effected within the spirit and scope of the invention as described hereinabove and as defined in the appended claims.

What is claimed is:

1. An energy distribution system for uniformly distributing radiant energy upon a circumferential area of height $h$ of a tubular member, comprising:

at least one radiant energy source means including focusing means for concentrating said radiant energy into an energy bundle substantially circular in cross section;

means for maintaining said circumferential area within said energy bundle; and side reflector means symmetrically disposed on either side of said circumferential area about an axis that is mutually perpendicular to and intersects the longitudinal axis of said tubular member and a straight line passing through the center of said energy bundle and the center of the source of radiant energy for collecting radiation impinging thereon and redirecting the collected energy toward the circumferential area of the tubular member, said reflector means each comprises two plano surfaces joined together to form an obtuse angle therebetween of between 100° and 130°, the concave surface of said side reflector means facing away from said tubular member.

2. An energy distribution system in accord with claim 1 wherein said focusing means has a substantially elliptical cross section said energy bundle being centered at one focus of said ellipse and the radiant energy source at the other.

3. An energy distribution system in accord with claim 1 wherein said obtuse angle is substantially 120°.

4. An energy distribution system in accord with claim 1 wherein said side reflector means have a height substantially equal to said height h and a width equal to at least 90 percent of envelope diameter.

5. An energy distribution system for uniformly distributing radiant energy upon a circumferential area of height h at the end of a tubular member enclosing the switch contact elements of a reed switch to effect the sealing of said contact elements in said tubular member, comprising:

radiant energy source means symmetrically disposed on opposite sides of said circumferential area, each source means including a radiant energy source and focusing means for concentrating the radiant energy from said source means into an energy bundle, said energy bundles being substantially coextensive with each other and having a substantially circular cross section;

means for maintaining said circumferential area of said tubular member and said switch contact elements in a predetermined relationship with respect to each other and within said energy bundle; and side reflector means symmetrically disposed on either side of said circumferential area and on an axis that is mutually perpendicular to and intersects the longitudinal axis of said tubular member and a straight line passing through the center of said radiant energy bundle and both of said radiant energy sources, said side reflector means being so shaped and so oriented as to collect radiation impinging thereon and to redirect the collected energy toward the circumferential area of the tubular member whereby radiant energy from each of said source means is concentrated in said circumferential area and said area is uniformly heated above its softening point and collapses about said switch contact elements to effect a seal therebetween.

6. An energy distribution system in accord with claim 5 wherein said side reflector means each comprise two plano surfaces joined to form an obtuse angle therebetween of 120° (+ 10°, − 20°), the concave surface of said side reflector means facing away from said tubular member.

7. An energy distribution system in accord with claim 6 wherein said side reflector means have a height and width substantially equal to said height $h$ and 90 percent of envelope diameter, respectively.

8. A method for distributing radiant energy from two radiant energy sources substantially uniformly upon a circumferential band of a tubular member, comprising the steps of:

symmetrically positioning said sources upon opposite sides of said tubular member;

focusing each of said sources to form a single substantially coextensive energy bundle about said circumferential band; and positioning a side reflector comprising two plano surfaces joined together to form an obtuse angle of 120° (+ 10°, − 20°) on either side of said circumferential band on an axis that is mutually perpendicular to and intersects at a common point the longitudinal axis of said tubular member and a straight line passing through the center of said energy bundle and each of said sources with the concave surface of each said side reflector facing away from the tubular member, whereby each of said side reflectors collects radiant energy from both of said sources and redirects the collected energy to said circumferential band.

* * * * *